Nov. 15, 1938. C. C. JAIN 2,137,051
APPARATUS FOR THE LIXIVIATION OF MINERAL ORES
Filed May 28, 1937
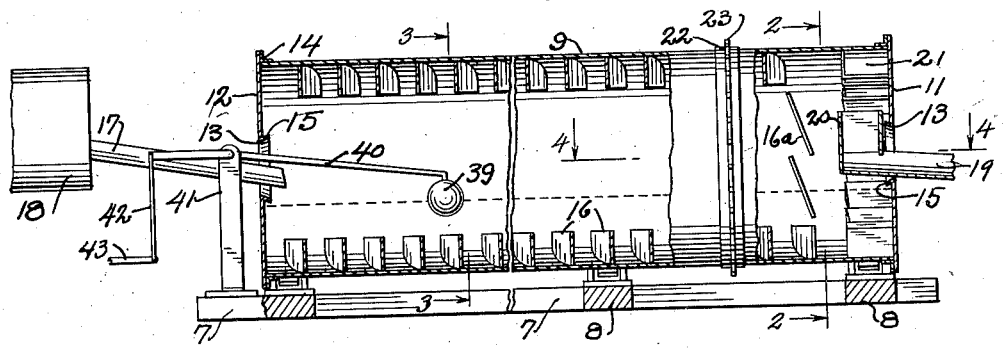
Fig.1.
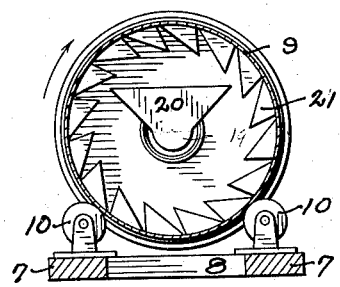
Fig.2.
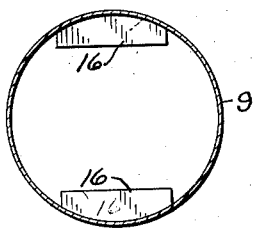
Fig.3.
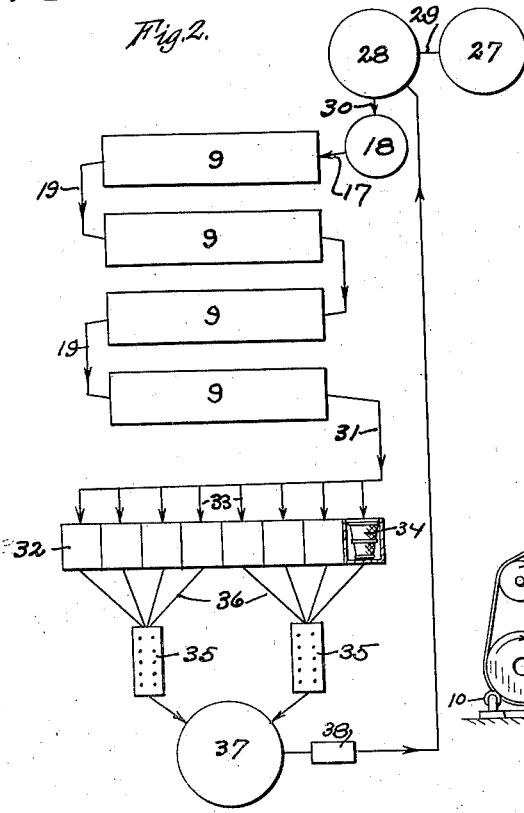
Fig.6.
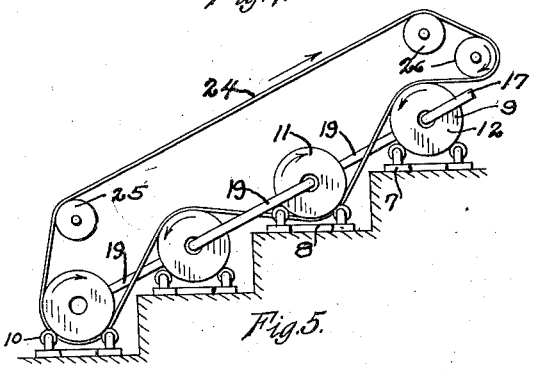
Fig.4.
Fig.5.
INVENTOR
Clyde C. Jain.
BY
Martin E. Anderson
ATTORNEY Patented Nov. 15, 1938

2,137,051

UNITED STATES PATENT OFFICE 2,137,051

APPARATUS FOR THE LIXIVIATION OF MINERAL ORES

Clyde C. Jain, Denver, Colo.

Application May 28, 1937, Serial No. 145,200

4 Claims. (Cl. 23—269)

This invention relates to improvements in methods and apparatus for lixiviation of ores.

In the mining of gold, especially where the gold occurs free and in very small particles, the ore has been subjected to leaching in a cyanide solution. In the old cyanide methods, the ore has not been reduced to a powder and as a result it required a long time for the chemicals to penetrate the ore and dissolve the gold or other minerals and besides, the solution had to be strong.

It is the object of this invention to produce a method for leaching ores, more especially gold bearing ores leached with a cyanide solution, which can be performed as a continuous process, with a much weaker cyanide solution than has heretofore been believed possible and which will require only a fraction of the time of the old cyanide methods.

Another object is to devise an apparatus in which the method can be carried out.

My improved method, briefly described, consists in first wet grinding the ore to a 60 minus mesh in a solution containing cyanide. This grinding releases the gold particles and brings them into direct contact with the leaching solution. The ore pulp from the pulverizer is then fed into a rotating agitator comprising one long tank, mounted for rotation about a substantially horizontal axis or the pulp may pass successively through a number of identical rotating tanks or drums, provided on their inner surfaces with means for agitating the pulp. The speed of rotation of the drums can be regulated so that the time required for the pulp to pass through is sufficient to effect a thorough leaching. From the agitators the pulp passes to filters and the filtrate then goes to the precipitators where the mineral held in solution is precipitated. The demetalized filtrate is then returned to a storage tank where more cyanide is added if necessary, and from the storage tank the solution passes to the pulverizer. The method is continuous and due to the fact that the ore is first ground to a fine powder in a leaching solution and constantly agitated throughout the entire leaching step, the metal particles are constantly brought into contact with fresh chemicals and the leaching is therefore effected rapidly and thoroughly with the result that the time required is greatly shortened and the cost correspondingly decreased.

In order to more clearly describe the process and the apparatus in which it is carried out, reference will now be had to the accompanying drawing in which the apparatus has been illustrated and in which:

Figure 1 is a diametrical section, on a vertical plane, through one of the cylindrical agitators in which the major portion of the leaching takes place, a portion being shown in elevation;

Figure 2 is a section taken on line 2—2 Fig. 1;

Figure 3 is a section taken on line 3—3 Fig. 1;

Figure 4 is a section taken on line 4—4 Fig. 1;

Figure 5 is an end elevation showing an assembly of four tubular members and shows one method of rotating the same; and Figure 6 is a diagram or flow sheet showing the several parts in assembled relation.

In the drawing, reference numerals 7 and 8 designate respectively the side and cross members of a base or frame for supporting a rotatable cylinder or drum 9. Supported by the base are a plurality of pairs of rollers 10 that in turn support the drum 9 for rotation about its longitudinal axis.

The drum 9 is preferably cylindrical as shown in the drawing and is so mounted that its axis of rotation is substantially horizontal. The ends of the drum are closed by walls 11 and 12, each of which is provided with an opening 13 concentric with the axis of rotation. The end walls are secured to the cylindrical portion of the drum in any suitable manner and have been shown as attached to the latter by means of angle irons 14. The edges surrounding the openings 13 are preferably bent inwardly as indicated by reference numeral 15, so as to serve as splash guards. The inner surface of the drum is provided with a plurality of inwardly extending segmental fins 16 that are arranged helically in the manner indicated in Fig. 4. In the drawing, two diametrically opposed rows of fins have been shown, but a greater number may be used if desired. Although the fins have been shown as arranged in rows, this is not an essential consideration as they may be staggered or arranged in any other suitable way. The opening in end wall 12 is the feed opening and projecting into the drum through this opening in a feed conduit or launder 17 that extends from the discharge opening of a pulverizer 18. Projecting into the drum through the opening 13 in end wall 11 is a discharge chute 19. The inner end of this discharge chute is provided with a hopper 20, somewhat as shown in Fig. 2. The purpose of this hopper will appear as the description proceeds.

It is apparent that since the openings 13 are located a considerable distance above the bottom of the drum or cylinder, the latter will serve as a tank or reservoir and maintain liquid at the level of the lower edges of the openings, unless the liquid is removed by some means especially designed for that purpose. In the present embodiment, means has been provided for raising liquid from the bottom of the drum and discharging it into the hopper 20, and this means consists of a plurality of buckets 21, that are arranged around the interior of the drum in the manner shown most clearly in Fig. 2. These buckets are so arranged that when they are at the bottom of the rotating drum, they will fill with pulp and this will be carried to a point above the hopper 20 and discharged into the latter. The drum 9 is intended to be rotated and for this purpose it has been provided with a ring 22 that has a sprocket flange 23 projecting from its outer surface. The manner in which the drum is rotated will be described in greater detail hereafter in connection with Fig. 5.

For the purpose of agitating the contents of the drum as it rotates and for moving it towards the discharge end, a plurality of segmental fins 16 have been provided. As above mentioned, these fins are arranged helically and when the drum rotates they will carry some of the contents upwardly in the direction of rotation and as the pulp flows downwardly, it will also be moved towards the discharge end by the action of the fins.

Near the discharge end a number of additional fins 16a have been provided to expedite the movement of the pulp towards the buckets.

Referring now more particularly to Fig. 5, it will be seen that where a number of cylinders are employed, as is usually preferable, because if a single cylinder is employed, the length will have to be in the neighborhood of 100 feet, which is rather objectionable from the point of view of the manufacturer and installation, and therefore, instead of employing one long cylinder, a plurality of shorter ones can be used and arranged in the manner indicated in Fig. 5. It will be seen that in the illustration given, there are four cylinders, each rotatable about an axis located at a different level. The feed conduit or launder 17 connects with one end of the upper cylinder and each discharge conduit 19 connects the discharge opening of an upper cylinder with the intake opening of the cylinder directly beneath, and in this way the pulp under treatment will flow in series through all of the drums or cylinders. Since the drums or cylinders are of identical construction but reversed in such a manner that the intake end of one is directly above the discharge end of the other, they must be rotated in opposite directions and this is accomplished by means of a sprocket chain 24 that engages with the sprockets 23 on the drums and engages the upper surface of one drum and the lower surface of the next lower drum. This endless sprocket chain passes around the drive sprocket 25, thence over one or more idlers 26 in the manner shown in Fig. 5.

In order to better explain the operation, reference will now be had to Fig. 6, which shows in a diagrammatic manner the relationship of the several elements. In this diagram or flow sheet, reference numeral 27 designates a water reservoir or tank from which the water necessary for the operation is obtained. The tank 27 is connected with a cyanide tank 28 by means of a pipe 29. The cyanide tank is connected by means of a pipe 30 with the pulverizer 18, which may be an ordinary ball or rod mill or of any other suitable type. The conduit 17 extends from the pulverizer to the intake end of the upper drum and the discharge end of this drum is connected by means of a launder 19 with the intake end of the drum directly beneath, and this is continued so that the pulp will flow through a number of cylinders in series. In the drawing, four drums or cylinders have been shown, each being approximately 24 feet in length, giving a total length of 96 feet. From the lowermost drum a discharge launder or conduit 31 extends to a position above a battery of filters, the individual elements of which have been designated by reference numeral 32. Branch conduits 33 extend from the launder 31 to each of the filters. The exact construction of the filters is immaterial as far as this invention is concerned, but as an example of a type of filter, the filter element at the right has been shown in section. The filter element consists of a tank in which a bag 34 of some suitable filter material is supported. When these bags become filled with sludge, they are removed and emptied. Positioned beneath the filters are precipitators 35, two of which have been illustrated, each precipitator is connected by means of pipes 36 with several filters, and there is therefore a constant supply of filtrate to the precipitators, even when some of the filters are not operating. The filtrate passes from the precipitators to a receiving tank 37 from which it is transferred by means of a pump 38 to the cyanide solution tank 28 where additional cyanide may be added if necessary.

Attention is called to the fact that although this invention has been described in connection with a cyanide treatment of ores, it is not necessarily limited to this solvent, as it is possible to employ the same mechanism and the same method with other solvents.

Referring now more particularly to Fig. 1, it will be seen that a float 39 has been illustrated and is supported from the inner end of an arm 40 that is pivoted in the upper end of a bracket 41. A connecting rod 42 extends from the outer end of the arm 40 and has its lower end connected to a member 43. Member 43 represents a throttle valve of an engine, either a steam or a gasoline engine, or if an electric motor is employed, the speed control lever of an electric speed controller. If the apparatus is rotated by means of a steam engine, a gasoline engine, or an electric motor, each of these prime movers should be provided with a speed control which is influenced by the float 39 in such a way that if the level of the pulp sinks, the speed of rotation is decreased, whereas if the level rises above a predetermined position, the speed of rotation is increased, and in this manner the speed at which the cylindrical members rotate will be automatically adjusted to the feed and by properly controlling the rate at which pulp is fed, the time that it takes the pulp to flow through the entire series of cylinders can be predetermined.

Let us now assume that the apparatus is to be used for the treatment of ore containing gold in free or metallic state, the latter is fed by suitable means into a pulverizer 18 where it is ground to liberation in a cyanide solution. The grinding is continued until the ore reaches a fineness of 60 minus and it is then passed through the conduit 17 into the receiving end of the uppermost cylinder in the series. The cylinder is constantly rotating and the ore pulp is therefore being constantly agitated by the action of the fins 16 and moved slowly towards the discharge end. When it reaches the discharge end, the pulp is picked up by the buckets 21 and discharged into the hopper 20 and passes from thence to the intake end of the next lower cylinder, and this continues until it has passed through the entire series, when it flows to the filters. The timing of the operation is such that after the ore has passed through all of the rotating tanks or cylinders, the gold contained therein will have been completely dissolved and will therefore be in chemical solution in the filtrate. The filtrate is passed to the precipitators 35 where it is subjected to the well known treatment by means of which the gold is precipitated and the cyanide solution is then returned to the tank 28 by means of the pump 38.

With the ordinary cyanide methods, the ore must be leached for many days before the gold is completely dissolved by the cyanide solution. In this method, due to the fact that the ore is ground to a fine pulp, and to the further fact that it is continuously agitated, the time of treatment can be greatly shortened and it has been reduced to as short a time as four hours. It is evident that by thus decreasing the time necessary for the treatment of ore, a great increased capacity for the same equipment or a much smaller apparatus can be employed for a given amount of ore to be treated. In either way, there is a great saving in the cost of ore treatment over and above that which has heretofore been possible with similar methods.

The drums 9 are rotated at a comparatively slow speed and usually only one rotation in two minutes is used and the speed may even be decreased beyond this, as the object is to agitate the pulp sufficiently to keep it from caking, and thereby procure constant contact between the metal particles of the pulp and the solution, and by this simple expedient, the reaction between the solvent and the metal is expedited so as to obtain the great reduction in time pointed out above.

In the drawing, the drums 9 have been shown as cylindrical and rotatable about substantially horizontal axes, but this can be departed from if desired by using frusto conical drums rotating about inclined axes and so positioned that the lower surfaces are horizontal in the direction of the axes. No advantage can be seen for this construction and mention is made thereof merely to show that when the expression is employed in the specification or in the claims, that the axes are substantially horizontal. This is intended to cover any equivalent arrangement.

Cyanide leaching is usually carried out in wooden tanks because the strong solution used will slowly dissolve iron or steel. In this method, however, the cyanide solution is so weak that it does not attack the iron or steel of which the cylinders are made. It is to be understood that any suitable material is to be used and that the cylindrical members may be made from wood if necessary.

Having described the invention what is claimed as new is:

1. An apparatus for use in lixiviating mineral ores, comprising in combination, a plurality of cylindrical drums mounted for rotation about substantially horizontal axes, the several axes being on different levels, each drum having end walls provided with openings concentric with the axes of rotation, the inside of each drum having segmental fins, helically arranged and spaced in the direction of the axis of rotation, means for feeding ore pulp, including a lixiviating liquid, to one end of the drum, a discharge spout extending through the other end of the drum, the several drums being of substantially identical construction, means interconnecting the several drums for simultaneous rotation, the fins being so inclined with respect to the axis of rotation that the solid material and the liquid will be moved from the feed end to the discharge end, means comprising buckets carried by the inside of each drum, adjacent the discharge end, for elevating ore pulp and delivering it to the discharge spout at a speed corresponding to the speed of rotation, the discharge chute of each drum terminating in the feed end of the next lower drum, and means associated with the first drum of the series for controlling its speed of rotation in accordance with the rate of feed, to maintain the pulp level constant.

2. In a mechanism for use in lixiviating mineral ores, in combination, a drum mounted for rotation, the bottom of the drum being substantially horizontal, the end walls of the drum having openings concentric with the axis of rotation, means for rotating the drum, means comprising a launder, for feding ore pulp, inclining a lixiviating liquid, into one end of the drum, means comprising helically arranged fins for agitating the pulp and moving it towards the discharge end as the drum rotates, means responsive to the speed of rotation of the drum for discharging pulp and liquid from the other end, and means comprising a float positioned within the drum for controlling its speed of rotation in accordance with the level of the pulp, whereby the rate of discharge will be maintained equal to the rate of feed.

3. An apparatus for use in lixiviating mineral ores, comprising in combination, a plurality of substantially identical cylindrical drums, mounted for rotation about substantially horizontal axes, the several axes being on different levels, each drum having end closures provided with openings concentric with the axis of rotation, a feed spout extending into one end of the upper drum and a discharge chute at the other end, each drum having its inner surface provided with a plurality of longitudinally spaced helically arranged fins which form means for agitating the ore pulp and moving it towards the discharge end during rotation, a discharge chute extending into the opposite end of each drum, means for rotating the drums at equal speeds in corresponding directions, means comprising buckets arranged around the discharge chute for elevating ore pulp and discharging it into the discharge chute at a rate corresponding to the speed of rotation, the discharge spout from the drums forming the feed spout of the next lower drum, and means comprising a float positioned within the upper drum for controlling its speed in accordance with the level of pulp therein, whereby the rate of discharge will be equal to the rate of feed.

4. An apparatus for the lixiviation of mineral ore pulp comprising in combination, an elongated cylindrical drum having its ends closed by walls having central openings, a feed launder extending into one end, a discharge spout extending through the opening in the other end wall, means comprising helically arranged fins on the inside of the drum for agitating the pulp and for moving it towards the discharge end, means for delivering pulp to the discharge chute at a rate proportional to the rate at which the drum rotates, means for rotating the drum, and means dependent on the pulp level within the drum for varying the speed of drum rotation in accordance with the liquid level whereby the rate of discharge will be substantially equal to the rate of feed and whereby the agitation and aeration per unit of pulp treated will be substantially constant.

CLYDE C. JAIN.